(12) United States Patent
Kurian et al.

(10) Patent No.: US 10,440,101 B2
(45) Date of Patent: Oct. 8, 2019

(54) SYSTEM FOR EXTERNAL VALIDATION OF PRIVATE-TO-PUBLIC TRANSITION PROTOCOLS

(71) Applicant: Bank of America Corporation, Charlotte, NC (US)

(72) Inventors: Manu Jacob Kurian, Dallas, TX (US); Darrell Johnsrud, Camas, WA (US)

(73) Assignee: Bank of America Corporation, Charlotte, NC (US)

( * ) Notice: Subject to any disclaimer, the term of this patent is extended or adjusted under 35 U.S.C. 154(b) by 570 days.

(21) Appl. No.: 15/049,865

(22) Filed: Feb. 22, 2016

(65) Prior Publication Data
US 2017/0244720 A1   Aug. 24, 2017

(51) Int. Cl.
| | | |
|---|---|---|
| *H04L 9/32* | (2006.01) | |
| *H04L 29/08* | (2006.01) | |
| *G06Q 40/00* | (2012.01) | |
| *G06Q 40/06* | (2012.01) | |
| *G06F 21/64* | (2013.01) | |

(52) U.S. Cl.
CPC .............. *H04L 67/10* (2013.01); *G06F 21/64* (2013.01); *G06Q 40/00* (2013.01); *G06Q 40/06* (2013.01); *H04L 9/3236* (2013.01); *H04L 67/22* (2013.01); *H04L 2209/38* (2013.01)

(58) Field of Classification Search
CPC .................................................... H04L 63/105
See application file for complete search history.

(56) References Cited

U.S. PATENT DOCUMENTS

| 5,671,283 A | 9/1997 | Michener et al. |
|---|---|---|
| 5,835,599 A | 11/1998 | Buer |

(Continued)

FOREIGN PATENT DOCUMENTS

| WO | WO 2014162296 | 10/2014 |
|---|---|---|
| WO | WO 2015135018 | 9/2015 |

OTHER PUBLICATIONS

Tasca. "Digital Currencies: Principles, Trends, Opportunities, and Risks." Trends, Opportunities, and Risks. Sep. 7, 2015 (Sep. 7, 2015); Retrieved from http://www.researchgate.net/profile/Paolo_Tasca/publication/290805276 Digital Currencies Principles Trends Opportunities and Risks/Links569bb91e)8ae6169e562552.pdf, p. 1, 5, 10, 12, 14.

(Continued)

*Primary Examiner* — Moustafa M Meky
*Assistant Examiner* — Sm Z Islam
(74) *Attorney, Agent, or Firm* — Michael A. Springs; Moore & Van Allen PLLC; Peter B. Stewart (57) ABSTRACT

Embodiments of the invention are directed to a system, method, or computer program product for generating and using a block chain distributed network for tracking and validating protocols and other operations associated with the transition of one or more resources from being arranged in a consolidated, privately-held structure to being arrange and/or distributed in a publicly available structure. In example implementations, the block chain database is used and updated to reflect the status degree of completion of protocols associated with the identification, characterization, and dissemination of resource characteristics and resource shares, including the fractional distribution of resource portions to effectuate the efficient transition of a resource.

18 Claims, 4 Drawing Sheets

(56) References Cited

U.S. PATENT DOCUMENTS

| | | | |
|---|---|---|---|
| 6,073,234 A | 6/2000 | Kigo et al. | |
| 6,324,286 B1 | 11/2001 | Lai et al. | |
| 6,725,303 B1 | 4/2004 | Hoguta et al. | |
| 6,850,252 B1 | 2/2005 | Hoffberg | |
| 6,973,187 B2 | 12/2005 | Gligor et al. | |
| 7,055,039 B2 | 5/2006 | Chavanne et al. | |
| 7,092,400 B2 | 8/2006 | Malzahn | |
| 7,184,549 B2 | 2/2007 | Sorimachi et al. | |
| 7,362,859 B1 | 4/2008 | Robertson et al. | |
| 7,392,384 B2 | 6/2008 | Hopkins et al. | |
| 7,428,306 B2 | 9/2008 | Celikkan et al. | |
| 7,502,933 B2 | 3/2009 | Jakobsson et al. | |
| 7,574,401 B1 | 8/2009 | Burns | |
| 7,649,992 B2 | 1/2010 | Raju et al. | |
| 7,764,788 B2 | 7/2010 | Tardo | |
| 7,979,889 B2 | 7/2011 | Gladstone et al. | |
| 8,078,874 B2 | 12/2011 | You et al. | |
| 8,107,621 B2 | 1/2012 | Celikkan et al. | |
| 8,155,311 B2 | 4/2012 | Shin et al. | |
| 8,259,934 B2 | 9/2012 | Karroumi et al. | |
| 8,358,781 B2 | 1/2013 | Schneider | |
| 8,397,841 B1 | 2/2013 | Taylor et al. | |
| 8,396,209 B2 | 3/2013 | Schneider | |
| 8,416,947 B2 | 4/2013 | Schneider | |
| 8,458,461 B2 | 6/2013 | Tardo | |
| 8,464,320 B2 | 6/2013 | Archer et al. | |
| 8,516,266 B2 | 8/2013 | Hoffberg et al. | |
| 8,590,055 B2 | 11/2013 | Yoon et al. | |
| 8,737,606 B2 | 5/2014 | Taylor et al. | |
| 8,942,374 B2 | 1/2015 | Fujisaki | |
| 8,983,063 B1 | 3/2015 | Taylor et al. | |
| 9,059,866 B2 | 6/2015 | Bar-Sade et al. | |
| 9,083,702 B2 | 7/2015 | Wied et al. | |
| 9,092,766 B1 | 7/2015 | Bedier et al. | |
| 9,298,806 B1 | 3/2016 | Vessenes et al. | |
| 9,635,000 B1 | 4/2017 | Muftic | |
| 9,672,499 B2 | 6/2017 | Yang et al. | |
| 2003/0126094 A1 | 7/2003 | Fisher et al. | |
| 2004/0172535 A1 | 9/2004 | Jakobsson et al. | |
| 2005/0256802 A1 | 11/2005 | Ammermann et al. | |
| 2008/0215500 A1 | 9/2008 | De La Motte | |
| 2009/0281948 A1 | 11/2009 | Carlson | |
| 2010/0279653 A1 | 11/2010 | Poltorak | |
| 2011/0078073 A1 | 3/2011 | Annappindi | |
| 2011/0197064 A1 | 8/2011 | Garcia Morchon et al. | |
| 2012/0066121 A1 | 3/2012 | Shahbazi et al. | |
| 2012/0284175 A1 | 11/2012 | Wilson et al. | |
| 2013/0198061 A1 | 8/2013 | Cheer et al. | |
| 2013/0232056 A1* | 9/2013 | Schulman | G06Q 30/02 705/37 |
| 2014/0006185 A1 | 1/2014 | Zurn et al. | |
| 2014/0089243 A1 | 3/2014 | Oppenheimer | |
| 2014/0310171 A1 | 10/2014 | Grossman et al. | |
| 2015/0172053 A1 | 6/2015 | Schwarz et al. | |
| 2015/0206106 A1 | 7/2015 | Yago | |
| 2015/0332283 A1 | 11/2015 | Witchey | |
| 2015/0379510 A1 | 12/2015 | Smith | |
| 2015/0379636 A1 | 12/2015 | Szabo et al. | |
| 2016/0012424 A1 | 1/2016 | Simon et al. | |
| 2016/0028552 A1 | 1/2016 | Spanos et al. | |
| 2016/0050203 A1 | 2/2016 | Hefetz | |
| 2016/0092874 A1 | 3/2016 | O'Regan et al. | |
| 2016/0125376 A1 | 5/2016 | Beatty et al. | |
| 2016/0191243 A1 | 6/2016 | Manning | |
| 2016/0275461 A1 | 9/2016 | Sprague et al. | |
| 2016/0292672 A1 | 10/2016 | Fay et al. | |
| 2016/0321654 A1 | 11/2016 | Lesavich et al. | |
| 2016/0321752 A1 | 11/2016 | Tabacco et al. | |
| 2016/0323109 A1 | 11/2016 | McCoy et al. | |
| 2016/0342978 A1 | 11/2016 | Davis et al. | |
| 2016/0342989 A1 | 11/2016 | Davis | |
| 2016/0342994 A1 | 11/2016 | Davis | |
| 2017/0005804 A1* | 1/2017 | Zinder | H04L 9/3247 |
| 2017/0046526 A1 | 2/2017 | Chan et al. | |
| 2017/0046652 A1* | 2/2017 | Haldenby | G06Q 20/0655 |
| 2017/0046664 A1 | 2/2017 | Haldenby et al. | |
| 2017/0046680 A1 | 2/2017 | Crites | |
| 2017/0091397 A1 | 3/2017 | Shah | |
| 2017/0103167 A1 | 4/2017 | Shah | |
| 2017/0103385 A1 | 4/2017 | Wilson, Jr. et al. | |
| 2017/0103461 A1 | 4/2017 | Acuña-Rohter et al. | |
| 2017/0116693 A1 | 4/2017 | Rae et al. | |
| 2017/0132626 A1 | 5/2017 | Kennedy | |
| 2017/0132630 A1 | 5/2017 | Castinado et al. | |
| 2017/0140375 A1 | 5/2017 | Kunstel | |
| 2017/0163733 A1 | 6/2017 | Grefen et al. | |
| 2017/0177855 A1 | 6/2017 | Costa Faidella et al. | |
| 2017/0178131 A1 | 6/2017 | Fernandez et al. | |
| 2017/0178237 A1 | 6/2017 | Wong | |
| 2017/0180134 A1 | 6/2017 | King | |
| 2017/0200137 A1 | 7/2017 | Vilmont | |
| 2017/0213209 A1 | 7/2017 | Dillenberger | |
| 2017/0214675 A1 | 7/2017 | Johnsrud et al. | |
| 2017/0214698 A1 | 7/2017 | Hughes et al. | |
| 2017/0220998 A1* | 8/2017 | Horn | G06Q 10/06311 |
| 2017/0221052 A1 | 8/2017 | Sheng et al. | |
| 2017/0223005 A1 | 8/2017 | Birgisson et al. | |
| 2017/0228447 A1 | 8/2017 | Catania et al. | |
| 2017/0230378 A1 | 8/2017 | Bliss | |
| 2017/0235955 A1 | 8/2017 | Barkan | |
| 2017/0236407 A1 | 8/2017 | Rhoads et al. | |
| 2017/0243020 A1 | 8/2017 | Dhondse et al. | |

OTHER PUBLICATIONS

Lerner. "MAVEPAY, A New Lightweight Payment Scheme for Peer to Peer Currency Networks." Apr. 17, 2012 ((Apr. 17, 2012) Retrieved from <https://pdfs.semamicscholar.org/1185/a26f014678b959876519065e2624458d75b8.pdf>. Entire document.

PCT International Searching Authority; International Search Report and Written Opinion for PCT/US2016/061402 dated Dec. 27, 2016.

Malahov, Yanislav Georgiev, "BitAlias 1, Aka Usernames for Bitcoin, A New Simple Naming System for Bitcoin Addresses", retrieved from https://medium.com/bitalias-decentralized-naming-and-identity-service/bitalias-7b66bffed9d8 on Mar. 12, 2017; Bringing Crypto to the People, Founder of www.aeternity.com, Jun. 6, 2015, 6 pages.

PCT International Searching Authority; Written Opinion for PCT/IB16/01655 completed Mar. 11, 2017, 8 pages.

PCT International Searching Authority; International Search Report for PCT/IB16/01655 completed Mar. 12, 2017, 4 pages.

Buterin, Vitalik, "On Public and Private Blockchains", Aug. 7, 2015, https://blog.ethereum.org/2015/08/07/on-public-and-private-blockchains/.

Bradley Hope et al., "A Bitcoin Technology Gets Nasdaq Test"; May 10, 2015; retrieved from http://www.wsj.com/articles/a-bitcoin-technology-gets-nasdaq-test-1431296886.

Nathaniel Popper, "Bitcoin Technology Piques Interest on Wall Street"; Aug. 28, 2015 retrieved from http://www.nytimes.com/2015/08/31/business/dealbook/bitcoin-techno, Aug. 31, 2015.

Joseph C. Guagliardo et al., "Blockchain: Preparing for Disruption Like It's the '90s"; Mar. 14, 2016, retrieved from http://www.law360.com/articles/77120CVprint?section=ip.

Robert McMillian, "IBM Bets on Bitcoin Ledger"; Feb. 16, 2016, retrieved from http://www.wsj.com/articles/ibm-bets-on-bitcoin-ledger-1455598864.

Richard Lee Twesige, "A simple explanation of Bitcoin and Blockchain technology"; Jan. 2015, retrieved from http://www.researchgate.net/profile/Richard_Twesige/publication/270287317_Bitcoin_A_simple_explanation_of_Bitcoin_and_Block_Chain_technology_JANUARY_2015_RICHARD_LEE_TWESIGE/links/54a7836f0cf267bdb90a0ee6.pdf.

* cited by examiner

SYSTEM FOR EXTERNAL VALIDATION OF PRIVATE-TO-PUBLIC TRANSITION PROTOCOLS

BACKGROUND

Historically, there have been advantages to the type of resource consolidation that allows for large volumes of resources to be held by a single individual or privately amongst a relatively small group of individuals. Such advantages may be particularly relevant to situations where the ability to rapidly control the movement or deployment of significant resources is necessary or otherwise efficient. However, in other contexts, additional efficiencies and other advantages may be derived from the use of a more distributed model, where resources are held on a smaller individual scale amongst a larger collection of individuals or entities, at least some of whom may be passive participants in the regular conduct of resource use and deployment. Notwithstanding the advantages that may be realized after the transition from a traditional, centralized holding model to a distributed model, the period of transition can present a number of technical challenges, particularly in relation to the management of the characterization, division, and reallocation of large volumes of resources.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an innovative system, method and computer program product for the external validation of a private-to-public resource transition via a block chain database.

In some embodiments, a block chain database is used to verify and track the completion of one or more underwriting operations associated with the private-to-public transition of a resource. In example embodiments that contemplate contexts where information transparency, confirmation of information with a high degree of confidence, and efficient transition of resources from one entity to another must be conducted on a compressed timescale, the use of a block chain database permits technical obstacles and impediments associated with traditional resource transition approaches to be avoided. This is particularly true as the scale of the transition increases.

In situations where distinct and/or particularized portions of a resource are designated for distribution to and amongst members of the public, the effective and accurate tracking of the location of each portion of the resource and the ability to rapidly deploy and disseminate additional resource portions when necessary is essential to the efficient transition of a resource. This is particularly true when the likelihood of oversubscription-type phenomena increases with smaller time scales and larger potential subscriber bases. Using a block chain database to implement the verification of relevant information and/or the storage of resource portions allows for tracking of key data and particularized resource portions in a manner that can be quickly and externally validated and permits errors to be detected and corrected prior to widespread propagation throughout the database and/or the public in a manner that impedes the efficient distribution of a resource.

Embodiments of the invention relate to systems, methods, and computer program products for externally validating a private-to-public resource transition, the invention comprising: receiving from a first source an indication that a first underwriting action has been completed; transmitting to a block chain distributed network the indication that the first underwriting action has been completed; and receiving from the block chain distributed network a verification that the first underwriting action has been completed.

Some example embodiments further comprise receiving from a second source an indication that a second underwriting action has been completed; transmitting to the block chain distributed network the indication that the second underwriting action has been completed; and receiving from the block chain distributed network a verification that the second underwriting action has been completed.

In some such example embodiments, and in other embodiments, the first underwriting action and the second underwriting action are associated with an initial public offering of a resource associated with a privately-held entity. In some example implementations of such embodiments, the block chain distributed network is a private block chain distributed network. In some other example implementations, the block chain distributed network is a public block chain distributed network.

In some example embodiments, including example embodiments or implementations that arise in the context of transferring shares of a privately-held resource to members of the public, the invention further comprises assigning to a first block in the block chain distributed network a first set of shares of the resource associated with the privately held entity; and assigning to a second block in the block chain distributed network a second set of shares of the resource associated with the privately-held entity, wherein the second block is held in a reserve pending the identification of a triggering event.

In some such example implementations, and in other example implementations, the invention further comprises receiving an indication that the triggering event has occurred; and initiating a transfer of the second set of shares of the resource associated with the privately-held entity.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

A "user", as referenced herein, may refer to an entity or individual that has the ability and/or authorization to access information associated with a resource, such as a divisible resource that is subject to a planned and/or pending private-to-public transition. A user may also be an individual or entity that has the ability and/or authorization to conduct transactions involving portions of a divisible resource that is subject to a planned and/or pending private-to-public transition. Furthermore, as used herein, the term "user device" or "mobile device" may refer to mobile phones, personal computing devices, tablet computers, wearable devices, and/or any portable electronic device capable of receiving and/or storing data therein.

A "resource" includes accounts and/or other property that may be made available to the user. In most example implementations contemplated herein, the resource is an ownership interest in a privately-held business entity that is transitioning to be a publicly-held business entity. Consequently, many example implementations envision the "resource" (either in whole or in its constituent parts, as shares of stock, including fractional shares. Notwithstanding the foregoing, the term "resource" need not be artificially limited to the context of stock and/or shares in a business entity, but rather the term "resource" can encompass a broad range of example items, including monetary assets, collections and portions thereof (such as collections of art, possessions, and/or other goods), commodities, accounts, other property, and the like.

In the context of example implementations described herein, a "transaction" or "resource distribution" refers to any transfer of resources to and/or from a user. Alternatively, in some embodiments, the term "transaction" may be used when describing the block chain database as a transaction type of record. The transaction type records consists of the actual data stored in the block chain. A transaction may refer to a purchase of shares of stock, goods, or and/or other resources.

Embodiments of the present invention address the above needs and/or achieve other advantages by providing apparatuses (e.g., a system, computer program product and/or other devices) and methods for operatively connecting with a block chain distributed network and using the block chain distributed network for facilitating the private-to-public transition of a resource.

In some embodiments, the block chain database may include real-time resource availability information, including real-time information about the resource and/or the privately-held entity with which the resource is initially associated. The block chain database may also include resource availability information as it pertains to the availability of shares of stock, including fractional shares, particularized bundles of shares, various types and categorizations of shares, and the like. In some example implementations, each time a transaction involving a portion of a resource occurs over time (such as the purchase and/or assignment of one or more shares of stock, the block chain database adds the new transaction to the distributed ledger. In this way, the movement of portions of a resource, can be tracked rapidly. Particularly in the context of an initial public offering, a portion of a resource may rapidly move between users and, by using the block chain database, transactions between and amongst users can be validated for purposes of further transactions. For example, once a stock becomes publicly available numerous users may seek to acquire sets of shares that can be combined with other sets of shares, divided amongst individual accounts represented by the user (such as in the context of mutual funds or other institutional investments), or otherwise acquire a desired number of shares at a given price point. The system may also determine the degree to which a particular set of shares may be oversubscribed and respond by making more shares available in a particularized manner, or otherwise address issues arising from localized and/or particularized spikes in demand.

While many of the examples described herein are placed in the context of an initial public offering, it will be appreciated that embodiments of the invention described herein may be implemented in other contexts, including secondary and other transfers of stock, other ownership offerings, bonds offerings, syndication, and the like.

Prior to the actual offering of a privately-held resource to the public, the block chain distributed network or block chain database may be used to facilitate the storage and validation of information associated with the private-to-public transition of the resource. For example, in the context of an initial public offering, there may be significant volumes of information and other data generated regarding the documentation required and/or issued by regulatory agencies, other disclosures required by law or customary practice, advertising and other marketing materials, company financial data, and other information that is relevant to the public's ability to examine and weigh potential investment options. As such information becomes available and published to a block chain distributed network, a generated chain of transaction records may track such information has been developed, issued, combined, otherwise presented, and verified over time. Using a block chain distributed network to store and make available such information permits the information to be externally validated by others, including, but not limited to, other users who are authorized to access portions of the resource and/or portions of the block chain. This in turn increases the trust that the public can have in the presented information and increase the transparency involved with the transition of resources that may not have been readily assessed and evaluated while privately held.

Embodiments of the invention are directed to a system, method, or computer program product for a distributive network system with specialized data feeds associated with the distributive network and specific triggering events associated with the data feeds for resource distribution, the tracking of the status of underwriting actions associated with the transition of a resource and transactions related therewith, and the validation of status of one or more portions of a resource. Thus, the system may communicate with, store, and execute code for real-time identification via a block chain database architecture.

Many example implementations of the invention disclosed herein are directed at the particular context of an initial public offering of the stock of a company that had previously been privately held. In particular, many example embodiments are directed to the underwriting of an initial public offering, and/or the actual transfer of shares at the time of the initial public offering to investors amongst the public. As such, many of the example embodiments reference an "underwriting action". Those skilled in the art will recognize that the underwriting of an initial public offering often involves the preparation and collection of large volumes of data from a wide variety of sources, such as information associated with requirements imposed by government regulatory agencies, authorizations and/or other statements made by regulatory agencies, disclosures required under the law, accounting information, other company financial information, marketing and advertising materials, and other documentation relating to the company, its stock, and the transition of that stock from a privately held structure to a publicly traded one. Consequently, the term "underwriting action" is meant to encompass any activity conducted in support of or in connection with an initial public offering or other similar transfer.

One of the primary technical obstacles that can be overcome by embodiments of the present invention, including embodiments that involve a block chain implementations is that of the efficient division and distribution of a large volume of value. In some contexts, an initial public offering is accomplished in part by the allocation of sets of shares to a number of entities, such as financial institutions or other entities qualified to handle and manage the initial transfer of stock. However, in view of the technical difficulties involved in moving large volumes of value over a compressed time scheduled, amongst a non-uniform distribution of potential purchasers, the distribution of shares is often imperfect in conventional systems, which can result in an failure to recognize and react to an oversubscription of some shares in some contexts, as well as the failure to sell otherwise desired shares in other contexts. As contemplated herein, the use of a distributed system can resolve issues associated with oversubscription, particularly to the extent that a potential oversubscription can be detected rapidly by a block chain distributed network and addressed quickly through the transfer of shares (such as shares held in a reserve) to points that reflect a potential oversubscription. In this way, many of the embodiments and implementations described herein are ultimately directed to the efficient satisfaction of demand for shares and the meeting of commitments to provide shares.

The implementation and use of a block chain database can overcome this technical obstacle, and other technical obstacles associated with information transparency and access, accurate tracking of resource purchases and accurate monitoring of allocations in real-time or near-real-time in several ways. In some example implementations, sets of shares may be stored in blocks that are in turn stored in a block chain distributed network, wherein each block can have description over what the block is, what it's intended for. In such implementations, the scale of the private-to-public transition (such as in an initial public offering) can be established and managed in an efficient manner.

The use of a block chain distributed network is also advantageous in that it permits and facilitates varying levels of access and permission amongst various users. For example, a single underwriter, or a lead underwriter be able to access all aspects of a block chain (both in the context of the sale of sets of shares stored in blocks, and the management, verification, and transmission of data associated with other underwriting actions associated with the initial public offering), while one or more secondary underwriters may have different access levels with respect to the blocks, amounts of stock, and the like that they are able to access and interact with.

The use of a block chain distributed network in the context of an initial public offering also can allows for open investor access. In situations where the block chain is used to store, verify, and publish data associated with the initial public offering, users and other members of the public can take advantage of the distributed nature of a block chain and the decentralized validation of data within the block chain to achieve a degree of confidence that the information is trustworthy, accurate, and up-to-date.

Additional technical advantages can be achieved through the use of a block chain database. For example, block chain databases are particularly useful in tracking and accounting for fractional portions of resources, including but not limited to fractional portions of shares. In contexts involving highly priced shares or initial public offerings that impose minimum buying requirements that are incompatible with an individual investor's particular needs, or where it may not be feasible for many individual investors to acquire a complete share, the block chain database may be used to facilitate partial share transfers.

The distributed nature of a block chain, coupled with its accessibility, may also permit for the efficient development of investment pools amongst users who may not otherwise be able to do so and reduce costs (such as overhead costs) to improve the efficiency of the transition of the stock from private to public. Similarly, large institutional investors may be able to utilize the advantages of a block chain distributed network to identify sets of available stock and efficiently acquire a particular desired position with respect to a stock offering without incurring the inefficiencies inherent in announcing stock purchasing plans publicly.

In most example implementations, the use of block chain distributed network also increases the speed with which transactions involving stock or other resources can be effectuated and validated, such that the potential that purchase or other transaction will be impacted by unforeseen changes in a stock's price on or between days is reduced.

Moreover, in the context of potentially oversubscribed stocks (or particular blocks of stocks) the block chain distributed network readily facilitates the implementation of reserve blocks that can be used to cover unexpected sales triggered by emergencies or failed purchases, thus improving the liquidity of the stock and the initial public offering in general. In some such implementations, it may be possible to switch between blocks to fulfil the critical needs of participants without impacting value.

It will be appreciated that in most contexts, an oversubscription, such as an oversubscription of shares of a resource involved in an initial public offering, is associated with a level of demand that exceeds the available supply (or the supply that is anticipated to be available, such as when an initial public offering is divided in a manner such that various entities are responsible for the sale of various blocks of stock). In such contexts, a technical challenge arises regarding how the available resources (i.e., shares) are efficiently allocated amongst potential purchasers. In some example implementations, a block that contains additional resource portions or shares can be associated with any of a number of rules regarding the allocation of shares, including but not limited to ranking allocation based on a price indicated by a prospective purchaser, the time a prospective purchaser subscribed, rules associated with an institutional structure, information pertaining to pre-existing relationships amongst entities, other obligations, and the like.

Those skilled in the art will appreciate that there are example implementations that may advantageously incorporate the assistance and/or expertise of a financial institution in the facilitation of underwriting and/or the private-to-public transition of a resource via a block chain, particularly as it applies to the tracking and verification of essential information, the transfer of funds and/or stock between, amongst, and from users and other participants, and identifying resource allocation rules or terms (such as pricing, timing, and other rules or requirements) that could be used in connection with the offering of stock or other resources. In some contexts, a financial institution may opt to facilitate the implementation of one or more block chain databases and make them available for use a set of users and/or the public. This may be particularly advantageous in contexts where the financial institution is primarily responsible for underwriting an initial public offering and/or has a stake in the efficient sale of shares of stock.

Figure 1:
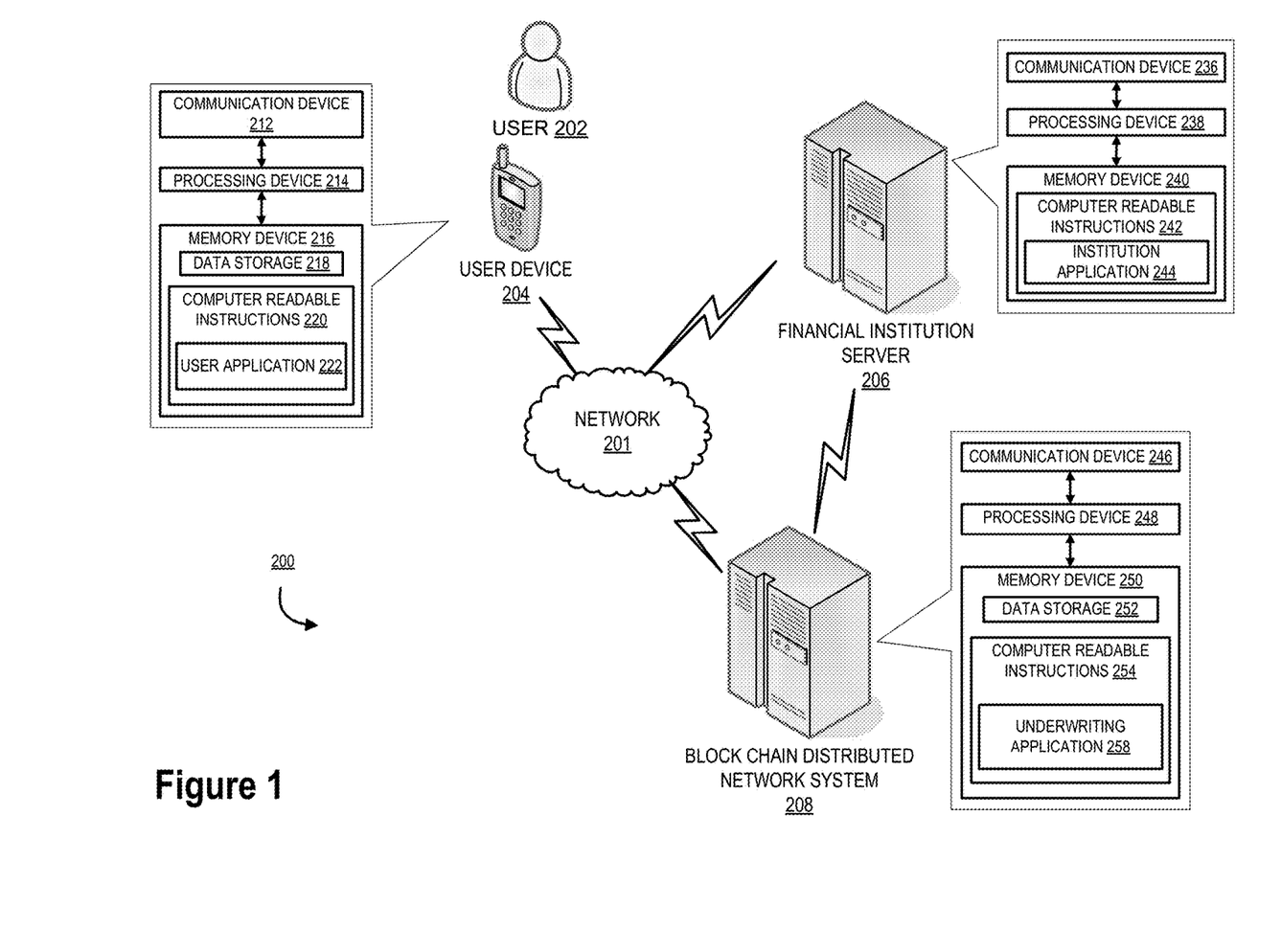
FIG. 1 provides a block chain identification system environment, in accordance with one embodiment of the present invention.

FIG. 1 illustrates block chain system environment 200, in accordance with one embodiment of the present invention. FIG. 1 provides the system environment 200 for which the distributive network system with specialized data feeds associated with the block chain implementation. FIG. 1 provides a unique system that includes specialized servers and systems communicably linked across a distributive network of nodes required to perform the functions of validating the status of the underwriting of a transfer of privately held resources to publicly-available resources.

As illustrated in FIG. 1, the block chain distributed network system 208 is operatively coupled, via a network 201 to the user device 204, and to the financial institution server 206. In this way, the block chain distributed network system 208 can send information to and receive information from the user device 204 and the financial institution server 206. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual that has the ability and/or authority to perform underwriting operations and/or verify information associated with underwriting operations. Those skilled in the art will appreciate that most example embodiments contemplate multiple such users. For example, as discussed above, a group of users may be underwriters or teams of underwriters, either associated together or in independent sub-groups (such as when multiple independent entities handle underwriting of an initial public offering). Consequently, while only one such user is depicted in FIG. 1, it will be understood that multiple users may operate in system environment 200. In some embodiments, the user 202 has a user device, such as a mobile phone, tablet, computer, or the like. FIG. 1 also illustrates a user device 204. The user device 204 may be, for example, a desktop personal computer, a mobile system, such as a cellular phone, smart phone, personal data assistant (PDA), laptop, or the like. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the financial institution server 206 and the block chain distributed network system 208. As such, the communication device 212 generally comprises a modem, server, or other device for communicating with other devices on the network 201.

The user device 204 comprises computer-readable instructions 220 and data storage 218 stored in the memory device 216, which in one embodiment includes the computer-readable instructions 220 of a user application 222. In some embodiments, the user application 222 allows a user 202 to complete a transaction and/or perform an underwriting action and/or verify an underwriting action.

As further illustrated in FIG. 1, the block chain distributed network system 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the financial institution server 206 and the user device 204. As such, the communication device 246 generally comprises a modem, server, or other device for communicating with other devices on the network 201.

As further illustrated in FIG. 1, the block chain distributed network system 208 comprises computer-readable instructions 254 stored in the memory device 250, which in one embodiment includes the computer-readable instructions 254 of an underwriting application 258. In some embodiments, the memory device 250 includes data storage 252 for storing data related to the system environment, but not limited to data created and/or used by the underwriting application 258.

Embodiments of the block chain distributed network system 208 may include multiple systems, servers, computers or the like maintained by one or many entities. FIG. 1 merely illustrates one of those systems that, typically, interacts with many other similar systems to form the block chain. In one embodiment of the invention, the block chain distributed network system 208 is operated by a second entity that is a different or separate entity from the financial institution server 206. In some embodiments, the financial institution server 206 may be part of the block chain. Similarly, in some embodiments, the block chain distributed network system 208 is part of the financial institution server 206. In other embodiments, the financial institution server 206 is distinct from the block chain distributed network system 208.

In one embodiment of the block chain distributed network system 208 the memory device 250 stores, but is not limited to, an underwriting application 258 and a distributed ledger. In some embodiments, the distributed ledger stores data including, but not limited to, smart identification logic and rules, user identifications, user legal identifications, associated logic and rules, resource allocation rules, resource allocation data, obligation rules, user obligation data, user profiles, underwriting rules, related data, and the like. In one embodiment of the invention, both the underwriting application 258 and the distributed ledger may associate with applications having computer-executable program code that instructs the processing device 248 to operate the network communication device 246 to perform certain communication functions involving described herein. In one embodiment, the computer-executable program code of an application associated with the distributed ledger and underwriting application 258 may also instruct the processing device 248 to perform certain logic, data processing, and data storing functions of the application.

The processing device 248 is configured to use the communication device 246 to gather data, such as data corresponding to transactions, blocks or other updates to the distributed ledger from various data sources such as other block chain network systems. The processing device 248 stores the data that it receives in its copy of the distributed ledger stored in the memory device 250.

In the embodiment illustrated in FIG. 1 and described throughout much of this specification, the underwriting application 258 may generate a method and attribute required for underwriting a private-to-public transition of a resource and/or verifying a particular underwriting action on a complete or partial basis. In this way, the underwriting application 258 generates a check on the underwriting actions associated with the private-to-public transition of a resource. As such, the underwriting application 258 may not store the information underlying a particular underwriting action, but instead may store an explicit guarantee that an underwriting action has been performed, has been verified, and/or has been performed or verified to a particular degree. As such, the underwriting application 258 may receive and store underwriting information (and/or underwriting action information), data associated with underwriting actions and/or efforts to perform or verify underwriting actions, data extracted from documentation associated with an underwriting action, data identifying resource availability (such as the availability of shares of stock, and, based on confirmation of the received data, confirm whether and to what degree an underwriting action has been performed and/or verified.

The underwriting application 258 may receive and/or confirm with other entities the completion and/or verification of an underwriting action through interaction with other entities. In this way, the block chain database connects with entities associated with a user, a resource holder, and/or an entity performing underwriting actions, such as account issuing entities, holding entities, regulatory entities, accounting entities, and/or management entities to generate a block chain database with information about the resource that is the subject of a private-to-public transition and the underwriting thereof. Furthermore, the underwriting application 258 may generate a token that is associated with a user and/or a particular underwriting action and/or source of underwriting information. In this way, upon communication with other systems on the network 201, the underwriting application 258 may communicate the token, thus not communicating or displaying sensitive or private information. The underwriting application 258 associated with the block chain distributed network system 208 maintains a list of data records, such as tokens associated with one or more users, underwriting action, and/or source of underwriting information, the security of which is enhanced by the distributed nature of the block chain. A block chain typically includes several nodes, which may be one or more systems, machines, computers, databases, data stores or the like operably connected with one another which is further illustrated below in FIG. 2B. The nodes in the block chain may be entities such as financial institutions that function as gateways for other entities.

In some embodiments, the underwriting application 258 may receive underwriting information via a generated method and attribute for requesting underwriting information associated with a resource that will be subject to a private-to-public transition. In this way, resource users (such as underwriters and/or prospective purchasers), resource holders or others responsible for the maintenance of resources and/or underwriting with respect to such resources, financial institutions, users 202 or the like may provide underwriting information to the underwriting application 258, such that the underwriting application 258 may have an indication of confirmation that an underwriting action has been completed (including partially completed). As such, the underwriting application 258 may not necessarily store all of the information associated with an underwriting, but instead store an explicit guarantee regarding the existence, completion, verification, and/or partial completion or verification of an underwriting action.

In some embodiments, the underwriting application 258 receives data associated with a resource or other documentation being used for underwriting with respect to the resource. As such, the underwriting application 258 may receive via the network 201 an electronic copy of documentation, and/or information associated with a particular underwriting action. In some embodiments, the receiver of the data or other documentation may provide the underwriting application 258 with the data and/or documentation being presented to him/her for satisfaction of an underwriting action or requirement. In other embodiments, a user 202 may notify the underwriting application 258 of the issuance or existence of information associated with an underwriting action. In yet other embodiments, a financial institution via a financial institution server 206 may provide the indication of an underwriting action has been completed.

In some embodiments, the underwriting application 258 extracts data from one or more received documents. As such, the information associated with the documents is extracted by the underwriting application 258 via scan, text recognition, or the like. The underwriting application 258 may identify account numbers, resource values, user names, or the like associated with the received document or documents. Furthermore, the underwriting application 258 may correlate the extracted information and user names to tokens for users and underwriting actions associated with the user.

As such, not disseminating personal information and user names, but instead associating them with tokens.

In some embodiments, the underwriting application 258 identifies the completion of an underwriting action via communication with an entity, such as a financial institution, independent auditor, accountant, regulatory body, law firm, or other entity that holds a responsibility to perform and/or verify a particular underwriting action. In this way, the underwriting application 258 may, using the information extracted from the data received from such an entity, to identify the completion of by a user 202 or by another of an underwriting action and generate and/or identify a token associated therewith. The underwriting application 258 may identify this based on information associated with documentation created or actions taken in the performance of an underwriting action. The underwriting application 258 may associate the underwriting action with a token. As such, the underwriting application 258 may utilize the token as the underwriting action throughout the process such that at no point may the actual underwriting data (which may be highly sensitive, proprietary, and/or not implicated by the private-to-public resource transition be disseminated. Subsequently, the underwriting application 258 may identify the particular underwriting action and/or documentation associated with the underwriting action by searching the distributed ledger. Once identified, underwriting application 258 compares the underwriting action with the efforts undertaken and/or documentation associated with the underwriting action, thus confirming the completion, or (or degree of degree of completion) of the underwriting action.

In some embodiments, the underwriting application 258, based on confirmation of the completion of an underwriting action, publishes the completion of the underwriting action. As such, the underwriting application 258 may communicate the completion of the underwriting action. The communication may be electronic form, such as an email, text message, or the like. Furthermore, the underwriting application 258 may mark the completed underwriting action in the distributed ledger.

As illustrated in FIG. 1, the financial institution server 206 is connected to the block chain distributed network system 208 and is associated with a financial institution network. In this way, while only one financial institution server 206 is illustrated in FIG. 1, it is understood that multiple network systems may make up the system environment 200. The financial institution server 206 generally comprises a communication device 236, a processing device 238, and a memory device 240. The financial institution server 206 comprises computer-readable instructions 242 stored in the memory device 240, which in one embodiment includes the computer-readable instructions 242 of an institution application 244. The financial institution server 206 may communicate with the block chain distributed network system 208 to provide real-time resource availability for a user account. While the block chain distributed network system 208 may communicate with the financial institution server 206 via a secure connection generated for secure encrypted communications between the two systems for communicating regarding underwriting actions, and/or the transfer of shares or other resource portions as part of a private-to-public transition.

It is understood that the servers, systems, and devices described herein illustrate one embodiment of the invention. It is further understood that one or more of the servers, systems, and devices can be combined in other embodiments and still function in the same or similar way as the embodiments described herein.

Figure 2A:
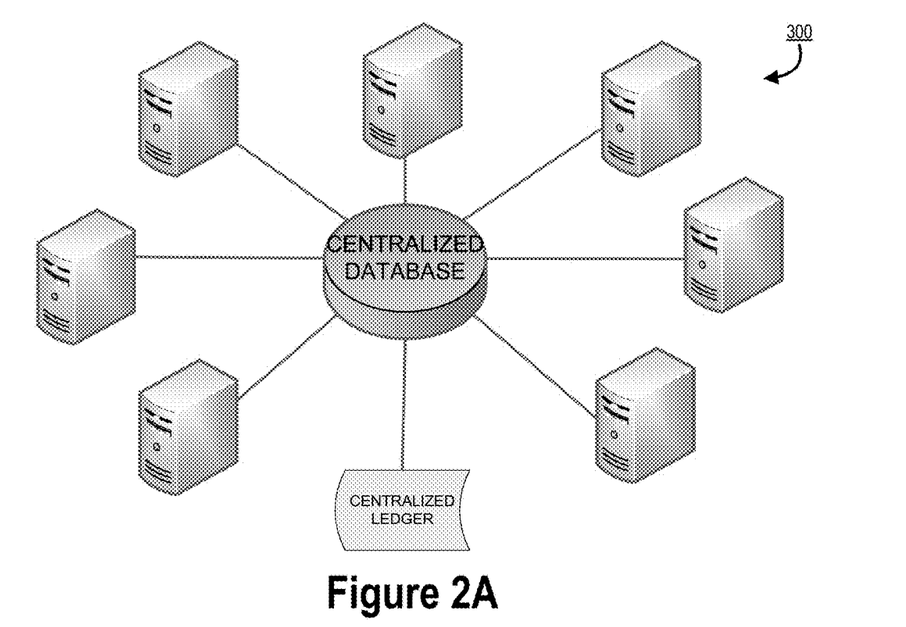
FIG. 2A provides centralized database architecture environment, in accordance with one embodiment of the present invention.

FIG. 2A illustrates a centralized database architecture environment 300, in accordance with one embodiment of the present invention. The centralized database architecture comprises multiple nodes from one or more sources and converge into a centralized database. The system, in this embodiment, may generate a single centralized ledger for data received from the various nodes.

Figure 2B:
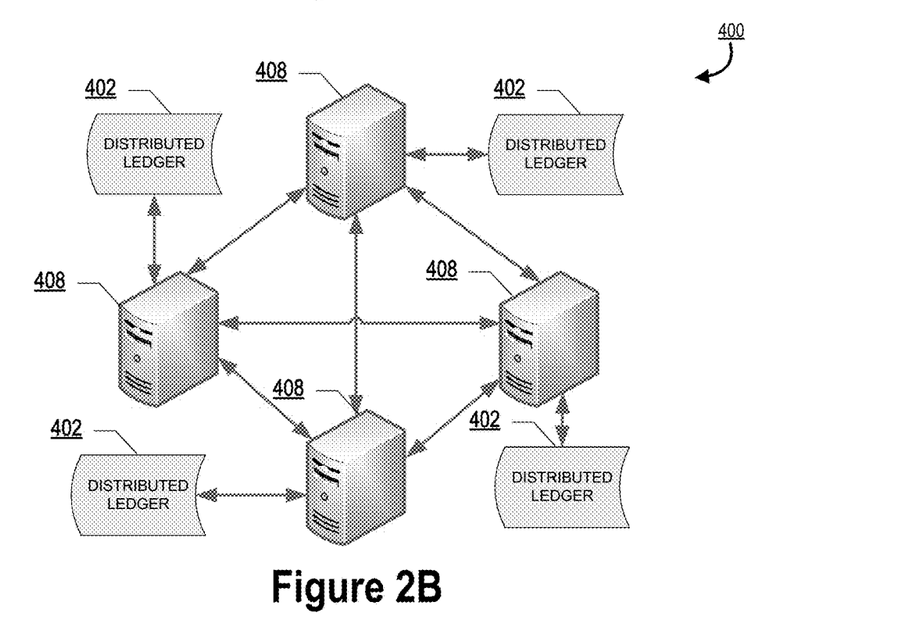
FIG. 2B provides a block chain system environment architecture, in accordance with one embodiment of the present invention.

FIG. 2B provides a block chain system environment architecture 400, in accordance with one embodiment of the present invention. Rather than utilizing a centralized database of data for underwriting actions (and/or the confirmation thereof) or the tracking of shares and/or other portions of a resource subject to a private-to-public transition, as discussed above in FIG. 2A, various embodiments of the invention may use a decentralized block chain configuration or architecture as shown in FIG. 2B in order to facilitate validation and verification of underwriting actions and/or transfers associated with a resource, including but not limited to the validation and verification of the underwriting actions associated with an initial public offering. Such a decentralized block chain configuration ensures accurate mapping of resource portions available within a resource (such as available shares) and ensures accurate mapping of the completion of underwriting actions, including the status of underwriting actions that may be required prior to an initial public offering. Accordingly, a block chain configuration may be used to maintain an accurate ledger of resources, underwriting actions and materials, and to provide validation transactions associated with the underwriting and implementation of an initial public offering. For example, the block chain database may include real-time underwriting and/or resource availability with respect to shares of a resource that will be issued to the public. Upon performing an underwriting action and/or agreeing to purchase a set of hares, a user may transmit documentation or other data associated with their action and activities to the system. The block chain system may identify the underwriting action and/or the agreement to purchase, identify the user associated therewith, and identify the degree to which any required steps have been completed. The system may confirm with the user and/or others that the information is accurate. The system may also identify and/or update the status of the resource (i.e., the shares) such that the user and/or others associated with the resource can ascertain the status of the resource subject to the private-to-public transition and the completion of any underwriting actions associated therewith. As such, the system may validate and verify the issuance of resource portions to one or more users and the completion of underwriting actions required or otherwise relevant to the private-to-public transition.

A block chain or blockchain is a distributed database that maintains a list of data records, such as real-time status of underwriting actions or share allocations, the security of which is enhanced by the distributed nature of the block chain. A block chain typically includes several nodes, which may be one or more systems, machines, computers, databases, data stores or the like operably connected with one another. In some cases, each of the nodes or multiple nodes are maintained by different entities. A block chain typically works without a central repository or single administrator. One well-known application of a block chain is the public ledger of transactions for cryptocurrencies. The data records recorded in the block chain are enforced cryptographically and stored on the nodes of the block chain.

A block chain provides numerous advantages over traditional databases. A large number of nodes of a block chain may reach a consensus regarding the validity of a transaction contained on the transaction ledger. As such, the status of a transaction, the satisfaction of an obligation, and any resources associated therewith can be validated and cleared by one participant.

The block chain system typically has two primary types of records. The first type is the transaction type, which consists of the actual data stored in the block chain. The second type is the block type, which are records that confirm when and in what sequence certain transactions became recorded as part of the block chain. Transactions are created by participants using the block chain in its normal course of business, for example, when someone sends cryptocurrency to another person, and blocks are created by users known as "miners" who use specialized software/equipment to create blocks. In some embodiments, the block chain system is closed, as such the number of miners in the current system are known and the system comprises primary sponsors that generate and create the new blocks of the system. As such, any block may be worked on by a primary sponsor. Users of the block chain create transactions that are passed around to various nodes of the block chain. A "valid" transaction is one that can be validated based on a set of rules that are defined by the particular system implementing the block chain. For example, in the case of cryptocurrencies, a valid transaction is one that is digitally signed, spent from a valid digital wallet and, in some cases that meets other criteria.

As mentioned above and referring to FIG. 2B, a block chain system 400 is typically decentralized—meaning that a distributed ledger 402 (i.e., a decentralized ledger) is maintained on multiple nodes 408 of the block chain 400. One node in the block chain may have a complete or partial copy of the entire ledger or set of transactions and/or blocks on the block chain. Transactions are initiated at a node of a block chain and communicated to the various nodes of the block chain. Any of the nodes can validate a transaction, add the transaction to its copy of the block chain, and/or broadcast the transaction, its validation (in the form of a block) and/or other data to other nodes. This other data may include time-stamping, such as is used in cryptocurrency block chains. In some embodiments, the nodes 408 of the system might be financial institutions that function as gateways for other financial institutions. For example, a credit union might hold the account, but access to the distributed system through a sponsor node.

Various other specific-purpose implementations of block chains have been developed. These include distributed domain name management, decentralized crowd-funding, synchronous/asynchronous communication, decentralized real-time ride sharing and even a general purpose deployment of decentralized applications. The block chain 400 may perform one or more of the steps or functions performed by the block chain distributed network system as discussed above with reference to FIG. 1.

In various embodiments of the invention, a block chain implementation is used to implement the validation and verification of underwriting actions and/or the allocation of shares associated with an initial public offering. For payments (such as when a borrower makes a complete or partial payment for shares) and/or performance and notification of underwriting actions, multiple active directories may be created. In such cases, a need exists to ensure mappings are not overloaded or redirected and in order to maintain a complete audit trail. The block chain configuration is used to index accounts and resources via mappings in all directories and maintain a full and visible audit trail. Mining is used, in some embodiments, to ensure that changes to specific mappings (e.g., mapping an alias to a financial institution and/or mapping resources in an account or resource pool) are confirmed and/or have reached a predetermined level of consensus. This also ensures unauthorized users are not manipulating the directories.

A completion of an underwriting action and/or a purchase or allocation of shares, is mapped to the appropriate user and/or the appropriate resource portion, financial institution, or other individual or entity associated with the underwriting action and/or resource transition. This information must be universally available to everyone on the network, and the block chain configuration enables such information distribution. In some embodiments of the invention, such a mapping, while integral to clearing (or validating) the underwriting action, aspects of the mapping of the underwriting action may be maintained as private information. For example, the mapping of a underwriting action (or an allocation of a resource portion such as stock) to an account number may be maintained at a server local to the financial institution. Thus, once an underwriting action has been placed on the public block chain, the block chain network recognizes that the underwriting action is mapped to a particular financial institution. That financial institution's server or system connected to the block chain receives the information about the requested underwriting action and can validate that action by looking up the appropriate mapping of, for example, payments and/or other account information. As noted, this information is not placed on the public block chain, but rather is held privately, such as on a private block chain or a "side-chain".

One advantage of using a block chain configuration for validation and/or verification of underwriting actions is the expedited conversion and an opportunity for scaling. Thousands of financial institutions, potential purchasers, underwriters, and related entities may participate in a block chain implementation, and, therefore, the time to validation of a transaction or the satisfaction of an obligation may be shortened. For example, a proposed completion of an underwriting action that is placed on the block chain may be validated by one or a predetermined number of nodes of the block chain in order for the underwriting action to be recognized. The nodes may work as miners or "validators" in order to confirm that a transaction associated with an underwriting action has properly occurred, and is mapped to a particular, valid underwriting action (or completion thereof). This determination may be based on the fact that the user or other individual or entity that originally mapped underwriting action has placed it on the block chain and in some cases, has included additional information such as a key that validates the underwriting action. In some embodiments, the key may be a digital signature that may be coupled with additional information that makes a declaration of validity by a financial institution and/or another entity responsible for monitoring and confirming the completion of the underwriting action.

The block chain may be configured with a set of rules to dictate when and how underwriting actions and/or resource (i.e., share) allocations are validated and recognized as being accurate and/or completed. In some embodiments, the rules dictate that the entity that performs an underwriting action cannot also verify the completion of the underwriting action. In some embodiments, the underwriting action may be posted to the block chain by an entity acting on behalf of the entity that performed the underwriting action. In some embodiments, the rules dictate that some or all underwriting actions may be approved by one or more validator nodes without further input from others. In some such cases, the rules may dictate that the mapped underwriting action, when placed on the block chain also includes additional information that is useful in determining whether the underwriting action is complete and/or to what degree the underwriting action is complete.

Figure 3:
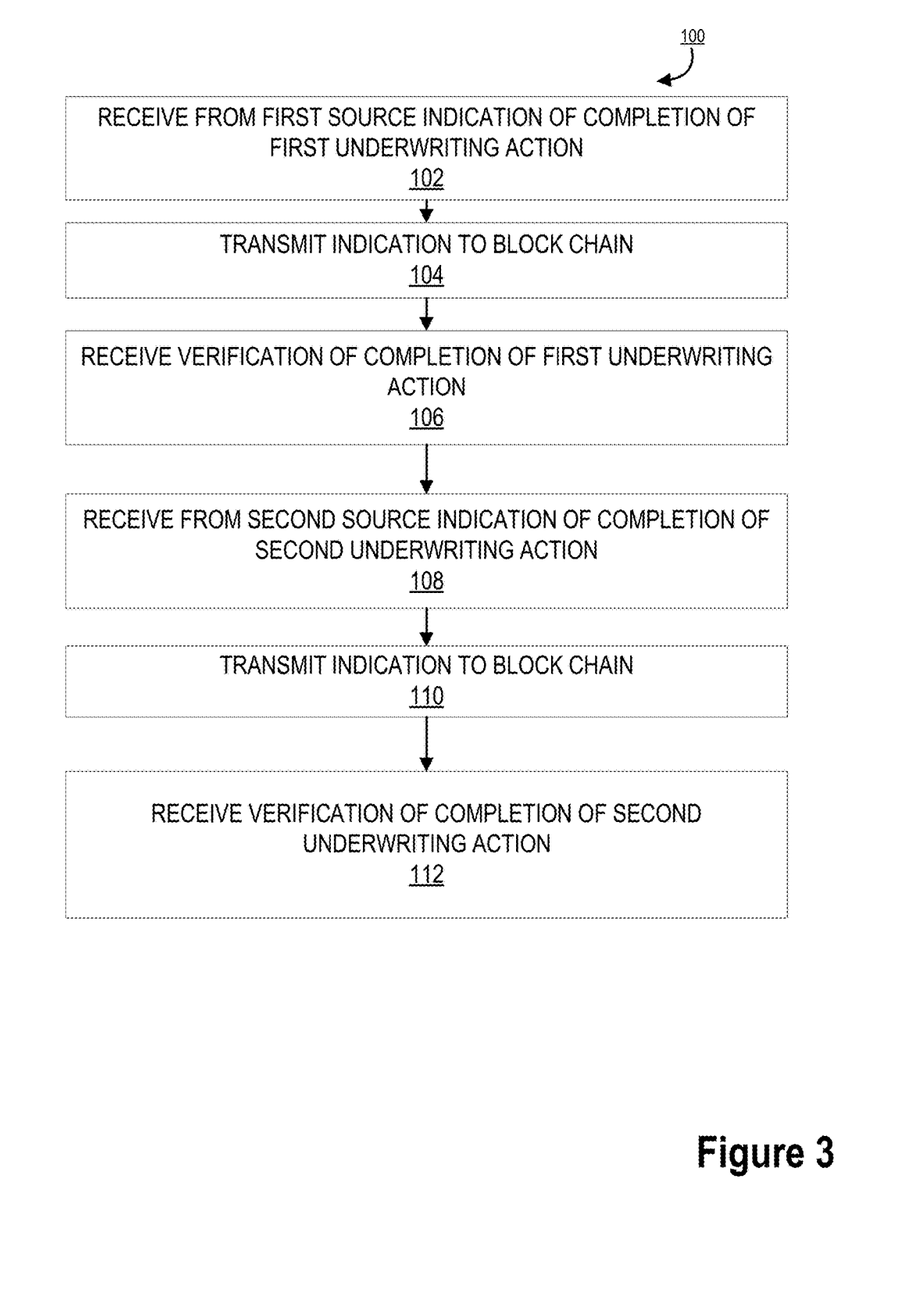
FIG. 3 provides a high level process flow illustrating a block chain resource transition validation process, in accordance with one embodiment of the present invention.

FIG. 3 provides a high level process flow illustrating a block chain resource transition validation process 100 in accordance with one embodiment of the present invention. As depicted in block 102, process 100 begins with receiving from a first source an indication that a first underwriting action has been completed. As discussed throughout this disclosure any of a number of entities may be associated with the underwriting of the private-to-public transition of a resource, particular in the context of an initial public offering. Consequently, example sources of an indication that a first underwriting action has been completed include, but are not limited to financial institutions, auditors, accountants, entities associated with the resource to be transitioned (such as the current holder of the resource), and others tasked with performing underwriting actions. In some implementations, the indication that an underwriting task has been performed may take the form of a message or other transmission sent to one or more entities. In some implementations, the indication comprises documentation and/or other materials generated in the course of performing the underwriting step.

Process 100 continues in block 104, which comprises transmitting to a block chain distributed network the indication that the first underwriting action has been completed. The block chain distributed network may exhibit any of the characteristics of a block chain distributed network described herein or the like. In some example implementations, particularly in implementations during the early stages of underwriting a private-to-public transition, the block chain distributed network may be private in the sense that access is restricted or limited. In some other example implementations, particularly those that take place close to an initial public offering, the block chain may be public, to ensure that potential investors can obtain, review, and gain confidence in the underwriting actions taken with respect to the initial public offering. In some example implementations, when the block chain distributed network receives the transmission of the indication that the first underwriting action has been completed one or more validators or other individuals or entities may opt to attempt to validate the completion of the first underwriting action.

As shown in block 106, if the block chain distributed network is able to confirm that the first underwriting action has been completed, the block chain may transmit a verification (which can be received) that the first underwriting action has been completed. In some example implementations, this may comprise the transmission and receipt of a notification. In other example implementations, the block chain may simply update the block chain and/or create a new block or record to reflect the underwriting action, which can then be checked and thereby received.

Process 100 continues with block 108, which comprises receiving form a second source an indication that a second underwriting action has been completed. As discussed above, and throughout this disclosure, numerous disparate entities perform numerous disparate underwriting actions in connection with the private-to-public transition of a resource, particularly in the context of an initial public offering. Block 108 contemplates the receipt from a second (different) entity an indication that a second underwriting action has been completed. For example, in block 102, the first source may have been a regulatory body, while in block 108, the second source may be an independent accountant. Those skilled in the art will recognize that any configuration of sources and underwriting actions may satisfy blocks 102 and 108, so long as the sources associated with the respective indications that an underwriting action is complete are different. Process 100 continues and concludes with blocks 110 and 112, which mirror blocks 104 and 106 in the sense that they are part of the validation of the completion of the respective underwriting action.

Figure 4:
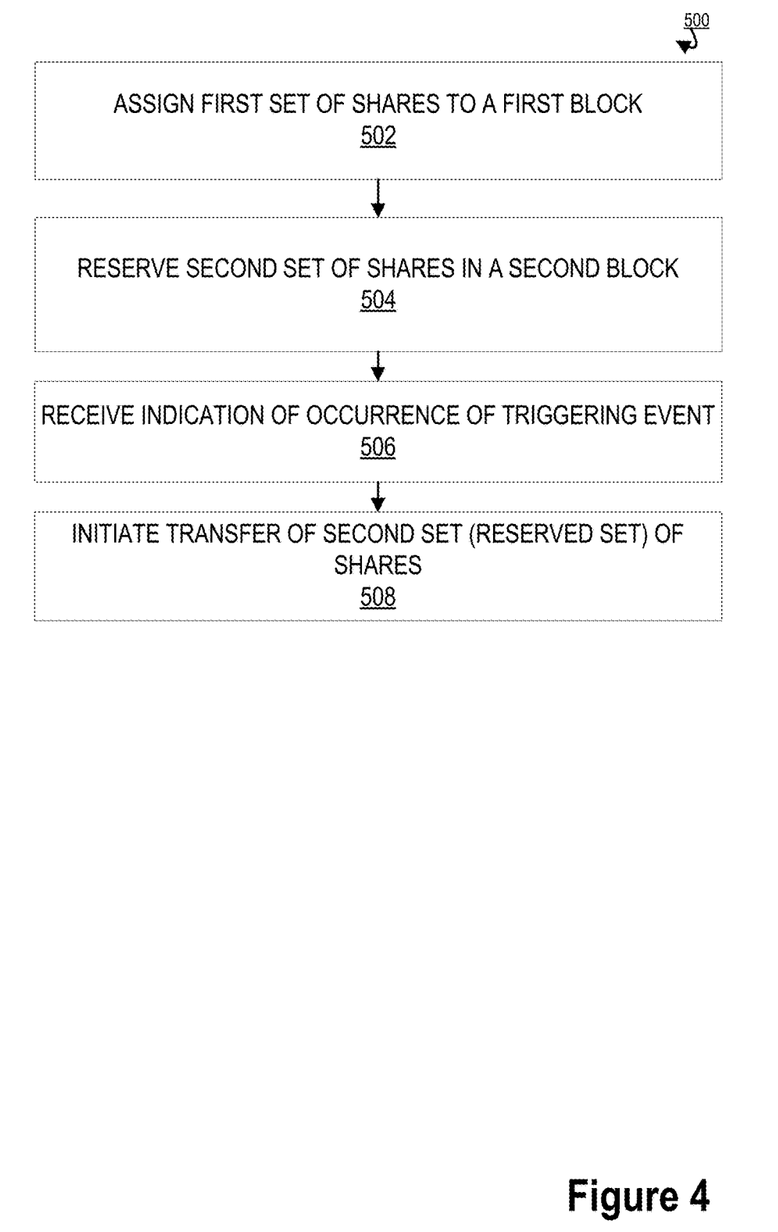
FIG. 4 provides a process flow illustrating a block chain resource distribution process, in accordance with one embodiment of the present invention.

FIG. 4 provides a process flow illustrating a block chain resource distribution process 500, in accordance with one embodiment of the present invention. Process 500 contemplates situations where, after a set of underwriting steps are completed, shares of a resource, such as shares that will be issued in an initial public offering, are allocated such that some shares are made available to be subscribed to and/or sold, and a second block of shares is held in reserve, such that should a triggering event like an oversubscription in a particular area, unforeseen demand, or other event occurs, the reserved shares can be rapidly deployed via the block chain distributed network to where they are needed.

As shown in block 502, process 500 comprises assigning a first block in the block chain distributed network a first set of shares of the resource associated with a privately held entity. Process 500 also includes block 504, which comprises assigning to a second block in the block chain distributed network a second set of shares of the resource associated with the privately-held entity, wherein the second block is held in a reserve pending the identification of a triggering event. Those skilled in the art will appreciate that a triggering event may be any action or occurrence that, in accordance with predetermine rules and/or a command, causes the reserved shares to be transferred to one or more entities. For example, if an oversubscription occurs, if a particular block of shares is insufficient to meet an order, if market conditions dictate the transfer, or if a command to transfer the shares is issued in accordance with predetermined rules, a triggering event is deemed to have occurred.

As shown in block 506, process 500 includes receiving an indication that a triggering event has occurred, which in turn triggers block 508, wherein the transfer of the reserved second set of shares is initiated.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

To supplement the present disclosure, this application further incorporates entirely by reference the following commonly assigned patent applications:

| Docket Number | U.S. patent application Ser. No. | Title | Filed On |
| --- | --- | --- | --- |
| 6823US1.014033.2555 | 14/942,326, now published as U.S. patent application Publication No. 2017/0140408 | TRANSPARENT SELF-MANAGING REWARDS PROGRAM USING BLOCKCHAIN AND SMART CONTRACTS | Nov. 16, 2015 |
| 6908US1.014033.2652 | 15/041,555, now published as U.S. patent application Publication No. 2017/0132630 | BLOCK CHAIN ALIAS FOR PERSON-TO-PERSON PAYMENTS | Feb. 11, 2016 |
| 6908USP1.014033.2556 | 62/253,935 | BLOCK CHAIN ALIAS PERSON-TO-PERSON PAYMENT | Nov. 11, 2015 |
| 6985US1.014033.2605 | 15/041,566, now published as | BLOCK CHAIN ALIAS PERSON-TO-PERSON | Feb. 11, 2016 |

-continued

| Docket Number | U.S. patent application Ser. No. | Title | Filed On |
|---|---|---|---|
| | U.S. patent application Publication No. 2017/0132615 | PAYMENTS | |
| 6988US1.014033.2607 | 15/050,375, now published as U.S. patent application Publication No. 2017/0132615 | SYSTEM FOR CONVERSION OF AN INSTRUMENT FROM A NON-SECURED INSTRUMENT TO A SECURED INSTRUMENT IN A PROCESS DATA NETWORK | Concurrently Herewith |
| 6989US1.014033.2608 | 15/050,379, now published as U.S. patent application Publication No. 2017/0243215 | SYSTEM FOR EXTERNAL SECURE ACCESS TO PROCESS DATA NETWORK | Concurrently Herewith |
| 6990US1.014033.2609 | 15/050,358, now published as U.S. patent application Publication No. 2017/0244721 | SYSTEM FOR PROVIDING LEVELS OF SECURITY ACCESS TO A PROCESS DATA NETWORK | Concurrently Herewith |
| 6991USP1.014033.2610 | 62/293,585 | SYSTEM FOR SECURE ROUTING OF DATA TO VARIOUS NETWORKS FROM A PROCESS DATA NETWORK | Feb. 10, 2016 |
| 6992USP1.014033.2611 | 62/293,620 | SYSTEM FOR CENTRALIZED CONTROL OF SECURE ACCESS TO PROCESS DATA NETWORK | Feb. 10, 2016 |
| 6993US1.014033.2612 | 15/049,605, now published as U.S. patent application Publication No. 2017/0230353 | SYSTEM FOR CONTROL OF SECURE ACCESS AND COMMUNICATION WITH DIFFERENT PROCESS DATA NETWORKS WITH SEPARATE SECURITY FEATURES | Concurrently Herewith |
| 6994US1.014033.2613 | 15/049,716, now published as U.S. patent application Publication No. 2017/0243208 | SYSTEM FOR CONTROL OF DEVICE IDENTITY AND USAGE IN A PROCESS DATA NETWORK | Concurrently Herewith |
| 6996US1.014033.2615 | 15/049,777, now published as U.S. patent application Publication No. 2017/0244707 | SYSTEM FOR ESTABLISHING SECURE ACCESS FOR USERS IN A PROCESS DATA NETWORK | Concurrently Herewith |
| 6997US1.014033.2616 | 15/049,835, now published as U.S. patent application Publication No. 2017/0243286 | SYSTEM FOR ALLOWING EXTERNAL VALIDATION OF DATA IN A PROCESS DATA NETWORK | Concurrently Herewith |
| 6998US1.014033.2719 | 15/050,094, now published as U.S. patent application Publication No. 2017/0214699 | SYSTEM FOR CONVERSION OF AN INSTRUMENT FROM A NON-SECURED INSTRUMENT TO A SECURED INSTRUMENT IN A PROCESS DATA NETWORK | Concurrently Herewith |
| 6998USP1.014033.2617 | 62/287,293 | SYSTEM FOR CONVERSION OF AN INSTRUMENT FROM A NON-SECURED INSTRUMENT TO A SECURED INSTRUMENT IN A PROCESS DATA NETWORK | Jan. 26, 2016 |

-continued

| Docket Number | U.S. patent application Ser. No. | Title | Filed On |
|---|---|---|---|
| 6999US1.014033.2720 | 15/050,098, now published as U.S. patent application Publication No. 2017/0213221 | SYSTEM FOR TRACKING AND VALIDATION OF MULTIPLE INSTANCES OF AN ENTITY IN A PROCESS DATA NETWORK | Concurrently Herewith |
| 6999USP1.014033.2618 | 62/287,301 | SYSTEM FOR TRACKING AND VALIDATION OF MULTIPLE INSTANCES OF AN ENTITY IN A PROCESS DATA NETWORK | Jan. 26, 2016 |
| 7000US1.014033.2721 | | SYSTEM FOR TRACKING AND VALIDATION OF AN ENTITY IN A PROCESS DATA NETWORK | Concurrently Herewith |
| 7000USP1.014033.2619 | 62/287,298 | SYSTEM FOR TRACKING AND VALIDATION OF AN ENTITY IN A PROCESS DATA NETWORK | Jan. 26, 2016 |
| 7001US1.014033.2620 | 15/050,372, now published as U.S. patent application Publication No. 2017/0243217 | SYSTEM FOR ROUTING OF PROCESS AUTHORIZATIONS AND SETTLEMENT TO A USER IN A PROCESS DATA NETWORK | Concurrently Herewith |
| 7002US1.014033.2621 | 15/050,285, now published as U.S. patent application Publication No. 2017/0243177 | SYSTEM FOR ROUTING OF PROCESS AUTHORIZATION AND SETTLEMENT TO A USER IN PROCESS DATA NETWORK BASED ON SPECIFIED PARAMETERS | Concurrently Herewith |
| 7003US1.014033.2622 | 15/050,292, now published as U.S. patent application Publication No. 2017/0243209 | SYSTEM FOR GRANT OF USER ACCESS AND DATA USAGE IN A PROCESS DATA NETWORK | Concurrently Herewith |
| 7033US1.014033.2638 | 15/050,294, now published as U.S. patent application Publication No. 2017/0243212 | SYSTEM FOR IMPLEMENTING A DISTRIBUTED LEDGER ACROSS MULTIPLE NETWORK NODES | Concurrently Herewith |
| 7039US1.014033.2644 | 15/049,852, now published as U.S. patent application Publication No. 2017/0243025 | SYSTEM FOR EXTERNAL VALIDATION OF DISTRIBUTED RESOURCE STATUS | Concurrently Herewith |
| 7040US1.014033.2645 | 15/050,316, now published as U.S. patent application Publication No. 2017/0243214 | SYSTEM FOR TRACKING TRANSFER OF RESOURCES IN A PROCESS DATA NETWORK | Concurrently Herewith |
| 7041US1.014033.2651 | 15/050,321, now published as U.S. patent application Publication No. 2017/02434287 | SYSTEM FOR MANAGING SERIALIZABILITY OF RESOURCE TRANSFERS IN A PROCESS DATA NETWORK | Concurrently Herewith |
| 7042US1.014033.2640 | 15/050,307, now published as U.S. patent application Publication No. 2017/0243213 | SYSTEM TO ENABLE CONTACTLESS ACCESS TO A TRANSACTION TERMINAL USING A PROCESS DATA NETWORK | Concurrently Herewith |

What is claimed is:

1. A system for validating a private-to-public resource transition, the system comprising:
   a memory device with computer-readable program code stored thereon;
   a communication device;
   a processing device operatively coupled to the memory device and the communication device, wherein the processing device is configured to execute the computer-readable program code to:
      receive from a first source an indication that a first underwriting action has been completed, wherein the first underwriting action is associated with an initial public offering of stock of a privately-held entity;
      receive information related to the first underwriting action;
      identify private information in the information related to the first underwriting action;
      in response to identifying the private information, generate or identify one or more tokens corresponding to the private information;
      based on a set of rules, verify that the first underwriting action has been completed;
      in response to verifying that the first underwriting action has been completed, store on a block chain a data record comprising the indication that the first underwriting action has been completed and verified, wherein the data record comprises the one or more tokens but does not comprise the private information, wherein the block chain is private prior to the initiation of the initial public offering;
      identify initiation of the initial public offering based on tracking a time period associated with the initial public offering; and
      in response to identifying initiation of the initial public offering, transition the block chain from private to public.

2. The system of claim 1 where in the processing device is further configured to execute the computer-readable program code to:
   receive from a second source an indication that a second underwriting action has been completed;
   verify that the second underwriting action has been completed; and
   in response to verifying that the first underwriting action has been completed, store on the block chain a data record comprising the indication that the second underwriting action has been completed.

3. The system of claim 1, wherein the processing device is further configured to execute the computer-readable program code to:
   assign to a first block in the block chain a first set of shares of the stock of the privately held entity; and
   assign to a second block in the block chain a second set of shares of the stock of the privately-held entity, wherein the second block is held in a reserve pending the identification of a triggering event.

4. The system of claim 3, wherein the processing device is further configured to execute the computer-readable program code to:
   receive an indication that the triggering event has occurred; and
   initiate a transfer of the second set of shares of the stock of the privately-held entity.

5. The system of claim 1, wherein receiving the information related to the first underwriting action comprises extracting the information from documentation related to the first underwriting action.

6. The system of claim 1, wherein the processing device is further configured to execute the computer-readable program code to map the first underwriting action to the first source, wherein mapping the first underwriting action allows the block chain to identify the first source upon storing the first underwriting action to the block chain.

7. A computer program product for validating a private-to-public resource transition, wherein the computer program product is embodied on at least one non-transitory computer-readable medium having computer-readable program code portions embodied therein, the computer-readable program code portions comprising:
   an executable portion configured for receiving from a first source an indication that a first underwriting action has been completed, wherein the first underwriting action is associated with an initial public offering of stock of a privately-held entity;
   an executable portion configured for receiving information related to the first underwriting action;
   an executable portion configured for identifying private information in the information related to the first underwriting action;
   an executable portion configured for, in response to identifying the private information, generating or identifying one or more tokens corresponding to the private information;
   an executable portion configured for, based on a set of rules, verifying that the first underwriting action has been completed;
   an executable portion configured for, in response to verifying that the first underwriting action has been completed, storing on a block chain a data record comprising the indication that the first underwriting action has been completed and verified, wherein the data record comprises the one or more tokens but does not comprise the private information, wherein the block chain is private prior to the initiation of the initial public offering;
   an executable portion configured for, identifying initiation of the initial public offering based on tracking a time period associated with the initial public offering; and
   an executable portion configured for in response to identifying initiation of the initial public offering, transitioning the block chain from private to public.

8. The computer program product of claim 7, wherein the computer-readable program code portions further comprise:
   an executable portion configured for receiving from a second source an indication that a second underwriting action has been completed;
   an executable portion configured for verifying that the second underwriting action has been completed; and
   an executable portion configured for in response to verifying that the first underwriting action has been completed, storing on the block chain a data record comprising the indication that the second underwriting action has been completed.

9. The computer program product of claim 7, wherein the computer-readable program code portions further comprise:
   an executable portion configured for assigning to a first block in the block chain a first set of shares of the stock of the privately held entity; and
   an executable portion configured for assigning to a second block in the block chain a second set of shares of the stock of the privately-held entity, wherein the second block is held in a reserve pending the identification of a triggering event.

10. The computer program product of claim 9, wherein the computer-readable program code portions further comprise:
an executable portion configured for receiving an indication that the triggering event has occurred; and
an executable portion configured for initiating a transfer of the second set of shares of the stock of the privately-held entity.

11. The computer program product of claim 7, wherein receiving the information related to the first underwriting action comprises extracting the information from documentation related to the first underwriting action.

12. The computer program product of claim 7, wherein the computer-readable program code portions further comprise mapping the first underwriting action to the first source, wherein mapping the first underwriting action allows the block chain to identify the first source upon storing the first underwriting action to the block chain.

13. A computer-implemented method for validating a private-to-public resource transition, the method comprising:
providing a computing system comprising a computer processing device and a non-transitory computer readable medium, where the computer readable medium comprises configured computer program instruction code, such that when said instruction code is operated by said computer processing device, wherein said computer processing device performs the following operations:
receiving from a first source an indication that a first underwriting action has been completed, wherein the first underwriting action is associated with an initial public offering of stock of a privately-held entity;
receiving information related to the first underwriting action;
identifying private information in the information related to the first underwriting action;
in response to identifying the private information, generating or identifying one or more tokens corresponding to the private information;
based on a set of rules, verifying that the first underwriting action has been completed;
in response to verifying that the first underwriting action has been completed, storing on a block chain a data record comprising the indication that the first underwriting action has been completed and verified, wherein the data record comprises the one or more tokens but does not comprise the private information, wherein the block chain is private prior to the initiation of the initial public offering;
identifying initiation of the initial public offering based on tracking a time period associated with the initial public offering; and
in response to identifying initiation of the initial public offering, transitioning the block chain from private to public.

14. The computer-implemented method of claim 13, wherein the computer processing device further performs the following operations:
receiving from a second source an indication that a second underwriting action has been completed;
verifying that the second underwriting action has been completed; and
in response to verifying that the first underwriting action has been completed, storing on the block chain a data record comprising the indication that the second underwriting action has been completed.

15. The computer-implemented method of claim 13, wherein the computer processing device further performs the following operations:
assigning to a first block in the block chain a first set of shares of the stock of the privately held entity; and
assigning to a second block in the block chain a second set of shares of the stock of the privately-held entity, wherein the second block is held in a reserve pending the identification of a triggering event.

16. The computer-implemented method of claim 15, wherein the computer processing device further performs the following operations:
receiving an indication that the triggering event has occurred; and
initiating a transfer of the second set of shares of the stock of the privately-held entity.

17. The computer-implemented method of claim 13, wherein receiving the information related to the first underwriting action comprises extracting the information from documentation related to the first underwriting action.

18. The computer-implemented method of claim 13, wherein the method further comprises mapping the first underwriting action to the first source, wherein mapping the first underwriting action allows the block chain to identify the first source upon storing the first underwriting action to the block chain.

* * * * *